Oct. 27, 1953
L. G. WELLER
2,657,100
SELF-UNLOADING BIN
Filed May 17, 1952
3 Sheets-Sheet 1
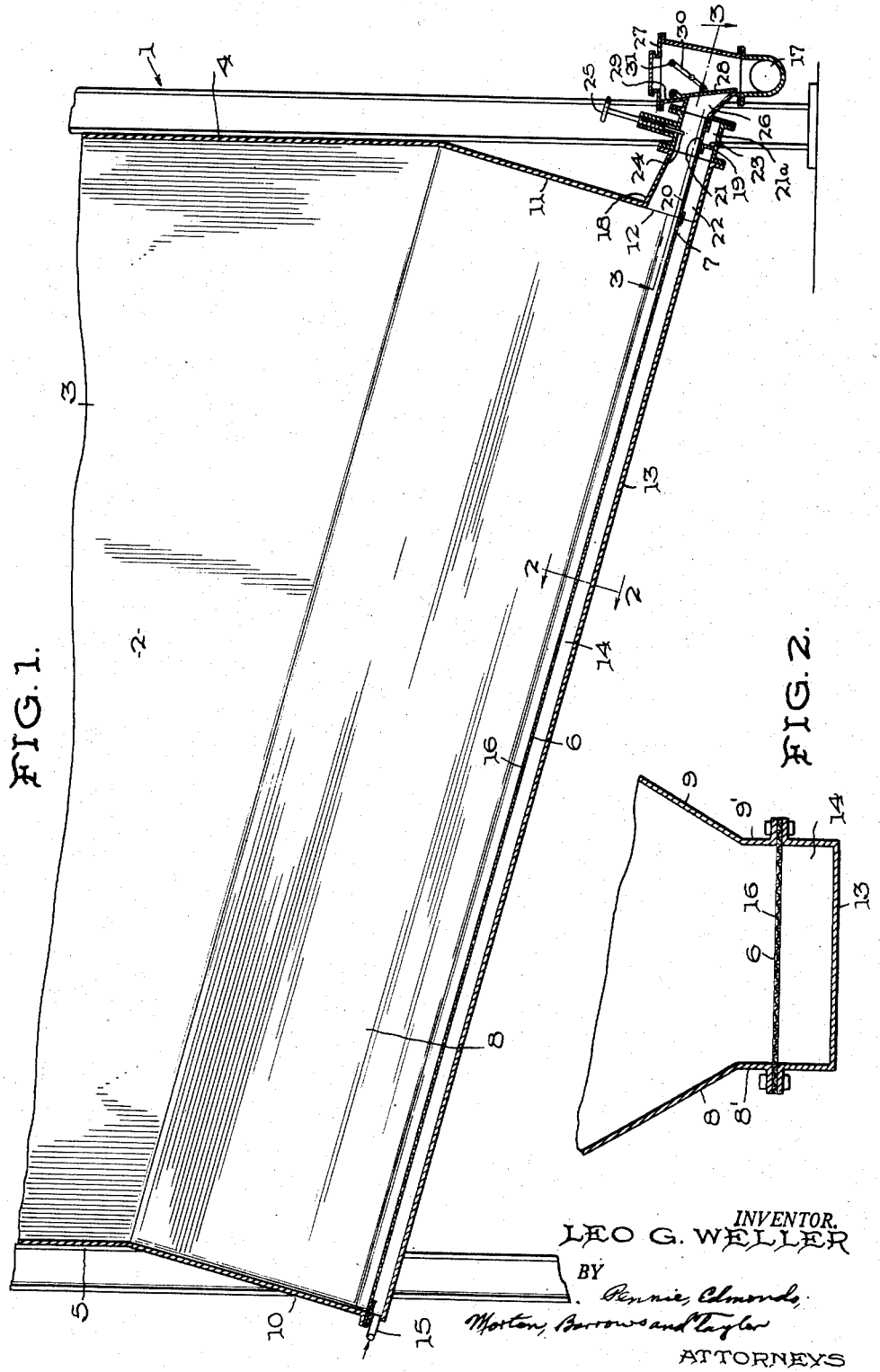
INVENTOR.
LEO G. WELLER
BY
ATTORNEYS Oct. 27, 1953  L. G. WELLER  2,657,100
SELF-UNLOADING BIN
Filed May 17, 1952  3 Sheets-Sheet 2
FIG. 3.
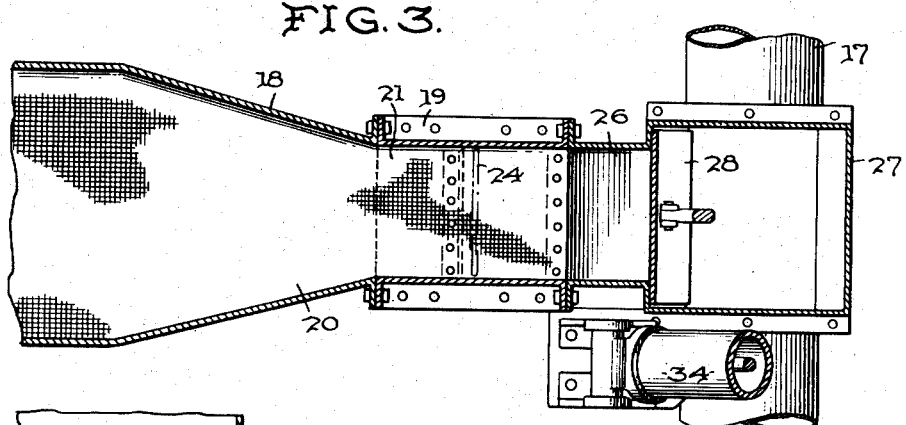
FIG. 4.
FIG. 6.
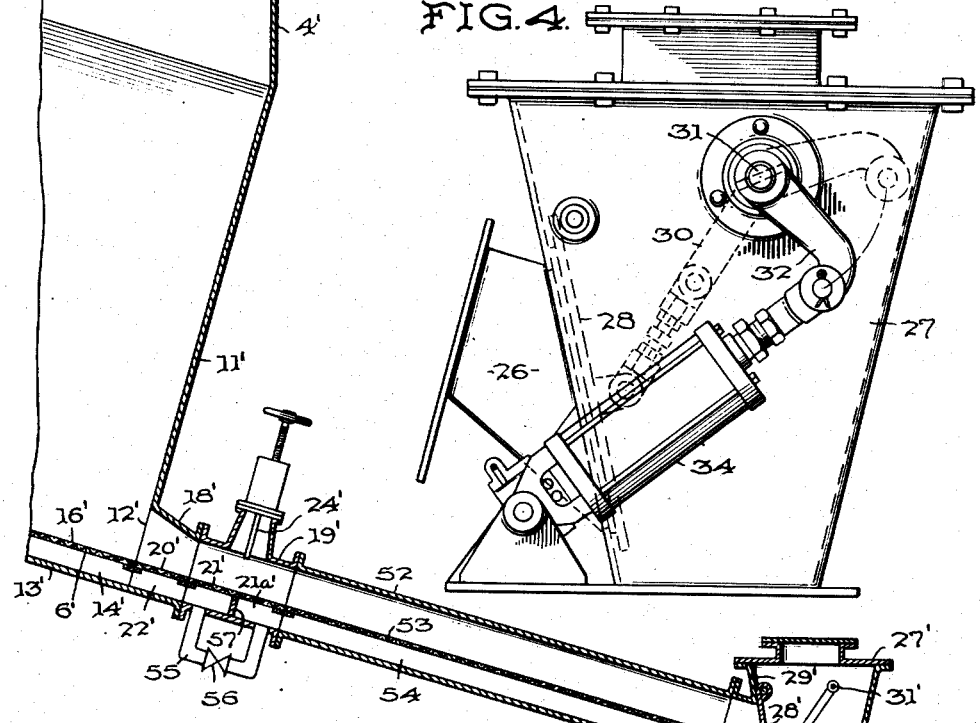
INVENTOR.
LEO G. WELLER
BY
*Pennie, Edmonds, Morton, Barrows and Taylor*
ATTORNEYS

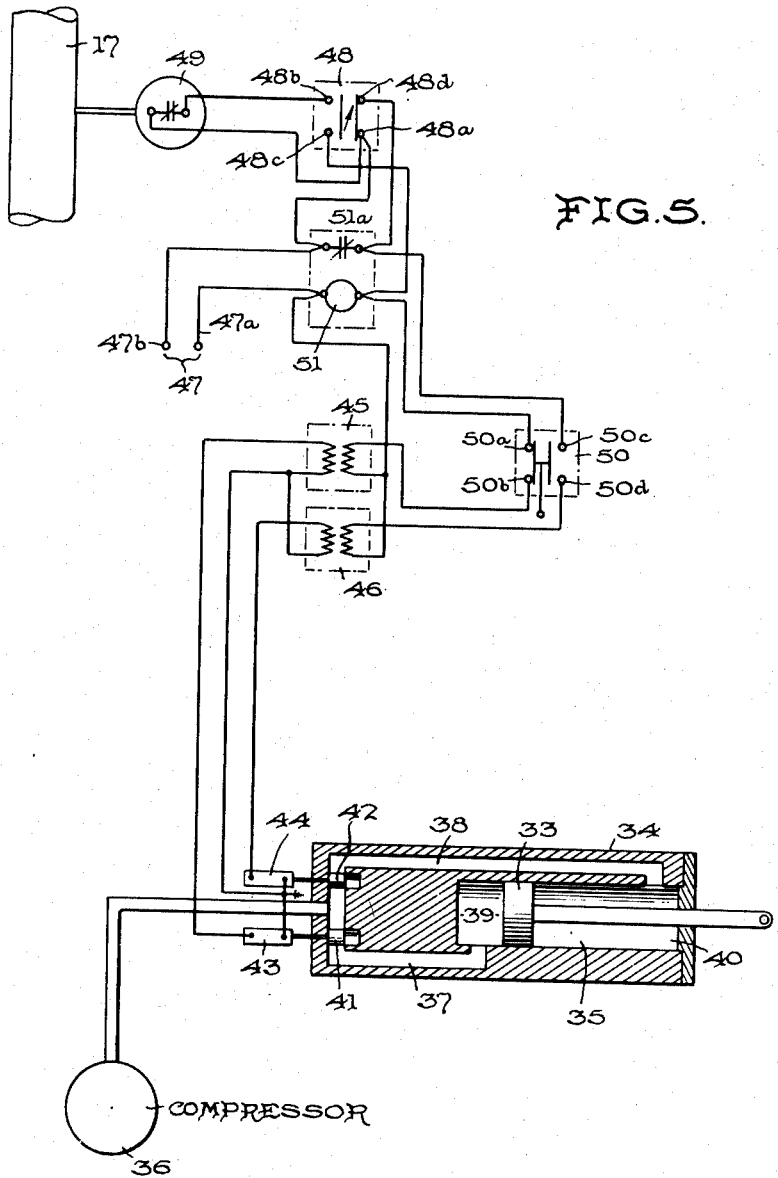

UNITED STATES PATENT OFFICE 2,657,100

SELF-UNLOADING BIN

Leo G. Weller, Catasauqua, Pa., assignor to Fuller Company

Application May 17, 1952, Serial No. 288,396

11 Claims. (Cl. 302—29)

This invention relates to the storing, discharging and transporting of pulverulent material and particularly to a storage bin for finely-divided, substantially dry material having means associated therewith for facilitating discharge of the material from the bin into a conveyor line for transport to a remote location.

The apparatus of the invention is especially designed for the storage in, and discharge from large stationary receptacles of pulverulent material such as flour, other pulverulent food products, dry, finely-divided chemicals, and other materials, and particularly those which do not flow freely from ordinary storage receptacles.

Of such pulverulent materials, flour is especially difficult to store for any length of time without infestation or deterioration, since it normally contains eggs or larvae of weevils or other insects. The longer the flour is stored before use, the greater is the likelihood that the eggs or larvae contained in the flour will mature with resultant infestation of the flour so that the flour no longer is satisfactory for human consumption. With previous bins for the storage of flour and similar material, deposits tend to remain in the corners when the bin is unloaded, and such deposits are not easily removed without actual entry into the bin. When mechanical conveyors, such as open screw conveyors arranged along the bottom of a bin, are used to withdraw material, the screws draw material from points remote from the bin discharge opening and the withdrawn material passes under the remaining material in storage. If such bins are not completely emptied before refilling, part of the material can remain indefinitely in storage, and, if the material is flour, progressive infestation is certain. If such deposits are formed, they tend to remain in the bin while other flour is conveyed into and discharged from the bin. Infestation of such deposits is likely because of their retention within the bin for long periods of time and, since insects in one portion of the stored flour can easily migrate to other portions thereof, there is considerable likelihood that all the flour in the bin will be infested. The present invention is especially designed to avoid the formation of deposits of materials in the corners of bins and to cause the material to be withdrawn substantially uniformly from the lowermost material in storage, which descends substantially uniformly and infestation due to stale material is thereby avoided.

Though the storage of flour, which is subject to infestation, has been particularly referred to, the apparatus of the invention may be used for the storage of many other materials. Examples of such materials which may be advantageously stored in, and discharged from such an apparatus are dry, finely-divided chemicals, such as cellulose derivatives, powdered resins, and solid acids, like adipic acid, etc. These chemicals are all expensive and must be maintained free from contamination by other chemicals or materials. Since the apparatus of the present invention is particularly designed to avoid the formation of deposits within its interior, during unloading thereof, such apparatus may be used for storage of different materials at different times without danger of any substantial contamination of one chemical by the residue left from a previously-stored different chemical, and without the necessity of someone entering the apparatus and cleaning it out.

Upon discharge from storage apparatus of the general type to which the present invention relates, the material is usually delivered into a conveyor line for transport to a remote location where the material is packaged, loaded into relatively small receptacles, or used. One of the best types of conveyors for such transportation to a remote point is the pneumatic conveyor, which furnishes a stream of air through an enclosed line by the creation of a vacuum in the conveyor line. Material delivered to such a conveyor is entrained in the air stream and carried along the conveyor line to the desired remote location. The apparatus of the present invention is particularly designed to facilitate delivery of material from its storage receptacle to a vacuum-type pneumatic conveyor line for transport to a remote location.

It has been previously proposed to provide storage apparatus for dry, finely-divided material with a mechanical feeder of the star or screw type which delivers the material from storage to a conveyor of proper design, for instance, a pneumatic conveyor. Such mechanical feeders discharge material in a pulsating stream in which the material is formed into compact inert masses. If the material is then to be suspended in a high-velocity air stream such as that provided by a vacuum conveyor, a large amount of the power furnished to such a conveyor would have to be dissipated in entraining the material in the air stream before it could be propelled along the conveyor.

In contrast with the previous storage and discharge apparatus, the apparatus of the present invention delivers material from its storage receptacle in a uniform steady pre-aerated stream of constant unit weight or density. Hence, the apparatus is of particular utility when used in conjunction with a pneumatic conveyor, since the continuously uniform pre-aerated stream discharge readily allows a higher material saturation of the air stream to be obtained in the conveyor, thus decreasing the amount of power needed to entrain the material in the air stream. The present apparatus in discharging material from its storage receptacle in an aerated condition, rather than in pulsations of compacted inert masses, decreases the power necessary to be supplied to a pneumatic conveyor used in conjunction with the apparatus to entrain the material in the conveyor air stream. It has been found that the use of apparatus designed in accordance with the present invention makes possible an increase in capacity of a pneumatic conveyor of as much as 50% over that possible with previous types of storage apparatus, without any increase in power consumption by the pneumatic conveyor.

Due to the lack of space in the vicinity of storage apparatus, it is often necessary to locate the pneumatic conveyor line at a distance from the storage apparatus. The present invention provides means for delivering the material from the discharge of the storage apparatus to such a remotely-positioned conveyor line.

The apparatus of the present invention comprises, generally, a bin having substantially-vertical walls defining a body portion, a bottom formed by a gas-permeable member positioned below the bin and above a plenum chamber, and a plurality of flow-directing surfaces joining the body portion of the bin with the side walls of the gas-permeable member. The flow-directing surfaces are inclined at an angle greater than the angle of repose of any material to be stored in the bin, so that the material will flow downwardly along said surfaces by gravity from the body portion of the bin onto the upper surface of the gas-permeable member where the material is subject to aeration by a gas delivered under pressure to the plenum chamber and which flows therefrom through the gas-permeable member into the material to aerate it. The gas-permeable member is inclined with respect to the horizontal, toward its discharge end, so that the aerated material on the upper, or material-conveying surface, of the gas-permeable member is caused to flow by gravitational force to a discharge opening in the lower portion of the bin.

To facilitate transportation of the material from the bin to the remotely-located pneumatic conveyor line, the apparatus may be provided with a duct extending from the bin discharge opening to the conveyor line. Supported between the upper and lower walls of this duct, and preferably co-extensive therewith, is a generally-horizontally extending gas-permeable member joined at one end with the gas-permeable member in the bin bottom to receive material therefrom and deliver it to the conveyor line. The space between the lower wall of the duct and the gas-permeable member forms a plenum chamber which may be connected with the plenum chamber beneath the gas-permeable member in the bin bottom to receive gas under pressure therefrom.

Control over the rate of discharge of the material from the bin is obtained through a manually-operable valve positioned in the duct above the conveying surface of the gas permeable member therein. An electrically-actuated cut-off valve is provided in the outlet of the duct to allow remote control over the discharge of material from the duct into the conveyor line.

If a vacuum-type pneumatic conveyor were used as the transport means and if the gas pressure in the plenum chamber of the duct were the same as that in the plenum chamber of the conveyor which forms the bottom of the bin, a greater pressure differential might exist across the gas-permeable member in the duct than that across the gas-permeable member in the bin because of the vacuum in the pneumatic conveyor, which communicates with the upper portion of the duct. To avoid such a condition, means are provided to control the volume of air supplied to the plenum chamber below the duct.

If too much material is delivered to the pneumatic conveyor at any one time, the air stream will not be able to entrain all the material and the conveyor line will become blocked. If material is still delivered to the conveyor line after such a block is formed, the conveyor air stream will not be able to remove the material and the conveyor will have to be stopped and opened to permit removal of the block. To avoid this, means responsive to the pressure in the conveyor line are provided to close automatically the cut-off valve when a block begins to form in the conveyor line in order that the conveyor air stream will have time to entrain the material and remove the block. The cut-off valve is then automatically reopened.

The apparatus of the present invention will be more fully described in conjunction with the accompanying drawings.

In the drawings:

Fig. 1 is a vertical sectional view through a preferred embodiment of the invention;

Fig. 2 is a sectional view taken on line 2—2 of Fig. 1;

Fig. 3 is a sectional view taken on line 3—3 of Fig. 1;

Fig. 4 is a side view showing the operating mechanisms for the cut-off gate of Fig. 1;

Fig. 5 is a schematic diagram showing the operation of the cut-off gate, and

Fig. 6 is a vertical sectional view through an apparatus embodying a modification of the invention.

In the embodiment of the invention shown in Figs. 1 through 5, the storage bin, generally indicated at 1, has a body portion 2 formed by a pair of opposite vertically-extending side walls 3, a vertically-extending front wall 4, and a vertically-extending rear wall 5. The bin has a closed bottom formed by an elongated gas-permeable member 6 formed of a material, preferably canvas, having a gas permeability not substantially exceeding 5, as will be hereinafter more fully discussed, disposed beneath the body portion 2 of the bin and extending lengthwise of the side walls 3 thereof. The width of the gas-permeable member 6 is substantially less than the distance between the side walls 3. The gas-permeable member is inclined with respect to the horizontal with its lowermost end 7 adjacent but below the front wall 4 of the body portion of the bin. Inclined walls 8 and 9, having short vertical sections 8′ and 9′, respectively, extend upwardly from the opposite sides of the gas-permeable member 6 to the lower edges of the side walls 3. The angle of inclination of the walls 8 and 9 is preferably greater than the angle of repose of any unaerated material which will be stored in the bin, so that during discharge of the material, gravity will cause the material to flow downwardly along those walls and onto the upper surface of the gas-permeable member.

The lower portion 10 of the rear wall 5 inclines rearwardly so that it meets the upper edge of the permeable member 6 at an angle not greater than about 90°. If the lower edge portion of the rear wall were continued vertically to meet the upper end of the gas-permeable member, the inclination of the gas-permeable member would result in an obtuse angle being formed where the rear wall meets it, which would be conducive to the formation of deposits of material on the lower portion of the wall 5, particularly at the corner where it meets the gas-permeable member.

An inclined wall 11 extends between the front wall 4 of the body portion and the lower end of the permeable member 6 and meets the latter at an angle of substantially 90°. The inclined wall 11 has a discharge port 12 opposite the lowermost end 7 of the permeable member.

The permeable member 6 extends across and is secured to the upper side of an upwardly-open channel member 13 to form therewith a plenum chamber 14 which is co-extensive with that portion of the permeable member which underlies the space between the vertical wall portions 8' and 9'. A pipe 15 is here shown connected to the uppermost end of the plenum chamber 14 to allow gas under pressure to be fed into the plenum chamber, but this air inlet may be connected at any convenient point.

When it is desired to discharge material from the bin, gas under pressure is fed through the connection 15 into the plenum chamber 13, from which it passes through the permeable member 6 into the pulverulent material resting on the upper conveying surface 16 thereof and aerates it. The aeration of the material and the resultant expansion increases the separation of the particles thereof and correspondingly decreases the internal particle-to-particle friction of the material. Because of the low gas permeability of the member 6, a substantially-uniform pressure will exist throughout the length of the plenum chamber. Consequently, there will be a uniform flow of gas through the gas-permeable member into the overlying pulverulent material which will cause a uniform aeration of the material along the entire length of the conveying surface 16.

The term "aeration" is employed herein and in the appended claims to mean penetration of any gas, not necessarily air, into the material at sufficient velocity to expand the material and thereby reduce the particle-to-particle friction but not at a velocity sufficient to entrain particles of material in the gas stream.

When a pulverulent material is aerated by passage of a gas through a horizontal gas-permeable member into it, it forms a definite angle with respect to the horizontal permeable member. This angle is termed the angle of repose of the aerated material and is substantially less than the angle of repose of the same material before aeration. If the permeable member is then inclined with respect to the horizontal to an angle at least as large as the angle of repose of the aerated material, gravity will cause the aerated material to flow along the permeable member to the lowermost end thereof. The angle of repose of an aerated pulverulent material is dependent upon the characteristics of the particular material and varies with different materials. However, it has been found that if the gas-permeable member has an inclination with respect to the horizontal of from about 4° to about 15°, practically any material which may be fluidized, will, when sufficiently aerated flow down such a member by gravity. Accordingly, the gas-permeable member 6 is disposed with its upper material-conveying surface 16 forming such an angle with the horizontal.

Since the wall 10 is inclined with respect to the rear wall 5 to form an angle of substantially 90° with the material-conveying surface 16 of the gas-permeable member, the angle between that wall and the vertical is also about 4° and 15°.

It is not necessary that air be used to aerate the material. The gas fed into the connection pipe 15 may be any gas which is inert with respect to the particular material in the bin, a heated or a refrigerated gas, or a gas chemically reactive with the material in the bin, depending upon the particular material and the characteristics which it is to have when discharged from the bin.

The gas-permeable member 6 is advantageously constructed of canvas, but may be of any gas-permeable medium having a permeability not substantially greater than 5. The term "permeability" as herein employed is defined as the amount of air measured in cubic feet at 20° F. and 25% relative humidity which will pass through an area of one square foot of dry porous stone in one minute when tested under an equivalent pressure differential of two inches of water.

It has been found that porous material having a permeability of from about 5 down to and including zero as determined by the above definition is satisfactory for use as the gas-permeable member in the apparatus of the present invention. Porous material having a permeability substantially above 5 is not satisfactory and its use is therefore not contemplated.

In the case of some materials, the application of an air pressure differential of two inches, w. g. pressure may not cause a sufficient volume of air to pass through the material, so that the permeability measured in accordance with the above definition would be zero. If such is the case, the resistance of the gas-permeable material must be such that with an airflow of 4 C. F. M./ sq. ft. through the uncovered medium, i. e., free of the material to be conveyed, a pressure differential of at least 3 inches of water across the gas-permeable material is produced.

If the gas-permeable member has a relatively-small width, the material may tend to form an arch over it with the lower ends of the arch resting on the inclined walls at the sides of the gas-permeable member. In such case, the uniform discharge of the material would be impeded by the presence of the arch. It has been found that if the permeable member is wide enough, for example 12" for some types of material, no arch will form. Consequently, the permeable member 6 of the embodiment shown in the drawings is relatively wide.

The material is transported from the storage bin to a remote location at which it is to be packaged or used by a pneumatic conveyor of the vacuum type which includes an elongated line or conduit 17 and means to create a vacuum therein so that material delivered into the conduit is propelled therealong by a moving, low-pressure air stream. In the embodiment of the invention shown in Figs. 1 through 5, a transition or connector section 18 connects the bin discharge port 12 with a valve section 19 which controls the amount of material which may be fed to the transport line. Since the volume of material which can be handled by a pneumatic conveyor is often less than that which can be discharged from the bin, the valve section is of less width than the gas-permeable member 6 and the discharge port 12, and the transition section is of diminishing cross-section, with its larger end attached to the bin and mating with the discharge port, and its smaller end attached to and mating with one end of the valve section. The transition section 18 has a gas-permeable member 20 carried between its side walls of width diminishing correspondingly with the changing cross-section of the transition section. The wider end of the gas-permeable member 20 is connected to the lowermost end 7 of the gas-permeable member 6 of the bin and is co-extensive therewith. The smaller end of the gas-permeable member 20 is connected to a gas-permeable member 21 carried between the side walls of the valve section 19 and is co-extensive therewith. The plenum chamber 13 beneath the gas-permeable member 6 connects with a corresponding plenum chamber 22 beneath the gas-permeable member 21 of the transition section, but gas introduced into the plenum chamber 22 is prevented from passing into the conveyor conduit 17 through the plenum chamber 21a in the valve section 19 by a wall 23 in the valve section.

The plenum chamber 21a may be supplied with air by venting the chamber to atmosphere wherein the differential in pressure created by the vacuum of the conveyor line will cause a flow of air from the chamber 21a through the gas-permeable member 21. Some materials maintain fluidization for a sufficient period of time to enable the flow to continue from the gas-permeable member 20 over the gas-permeable member 21 without air passing through this latter member. In this event, it is not necessary to provide a source of air for the chamber 21a.

Within the valve section 19 is a gate valve 24 movable with respect to the upper surface of the gas-permeable member 21 by a manually-operable handle 25 to change the depth of material which may move through the valve section along the upper surface of the gas-permeable member 21.

As explained above, it is advantageous to have the gas-permeable member in the bin relatively wide. On the other hand, it is desirable, since a narrow gate opening permits closer control over the rate of discharge than does a wide opening, that the gate opening be relatively narrow. The tapering transition section 18 provides for both considerations. In addition to the side walls of the transition section converging towards the valve section, the top wall thereof also converges towards the valve section. Thus, the cross-sectional area in which the gate operates is small relative to the size of the discharge port. The end of the valve section remote from the transition section 18 is connected to the inlet side 26 of a cut-off valve section 27, having a cut-off gate 28 which, in its closed position, registers with the outlet of the valve section 19, thus preventing material from passing into the cut-off valve section and out through its bottom discharge opening into the pneumatic conveyor when the cut-off gate is closed.

The cut-off gate 28 is hinged at its upper end to a side wall 29 of the cut-off valve section 27. An arm 30 is pivotally attached at one end of its ends to the gate 28 below the midpoint of the gate, and at its other end to a rotatable rod 31 which is journalled between opposing side walls of the cut-off valve section. The rod 31 is connected by a lever arm 32 to the piston 33 of a fluid motor 34 mounted on a side of the cut-off valve section. The piston 33 reciprocates in a chamber 35 formed in the interior of the fluid motor 34.

Fluid under pressure, preferably air, is furnished from a compressor 36, or other suitable source, to the chamber 35 through one of a pair of passages 37 and 38 formed in the body of the fluid motor. The passage 37 directs fluid from the compressor to the end 39 of the chamber 35 and the passage 38 directs fluid from the same source to the end 40 of the chamber. The passages 37 and 38 have valves 41 and 42, respectively, movable therein to selectively block and permit passage of fluid therethrough to the chamber 35.

The positions of the valves 41 and 42 are controlled by a pair of solenoids 43 and 44, respectively. The operating coil of each of the solenoids has one of its terminals connected to one side of the secondary winding of one of a pair of control transformers 45 and 46. The other sides of the secondary windings of the transformers are connected together and a common connector leads therefrom to the other terminal of each of the operating coils of the solenoids which are preferably grounded.

One side of each of the primary windings of the transformers 45 and 46 is connected through a common conductor to one side 47a of a source of A.-C. voltage 47. The other side 47b of the A.-C. source is connected to a contact 48a of a double-pole, double-throw selector switch 48. The contact 48a of the selector switch is connected to one side of a normally-closed vacuum switch 49. The vacuum switch is responsive to pressure in the conduit 17 in such manner that its contacts open when the vacuum therein exceeds a predetermined value. The other side of the vacuum switch 49 is connected to a contact 48b of the selector switch 48, which contact in turn is bridged by a switch arm of the selector switch to the contact 48c thereof when the selector switch is in its "open" position. Contact 48c of the selector switch is connected to a contact 50a of a double-pole, double-throw limit cut-off switch 50 which operates in response to the travel of the piston 33 in chamber 35. In one position of the cut-off switch 50, contact 50a thereof is bridged by the switch to contact 50b, which in turn is connected to the high side of the primary winding of the transformer 45.

In the other position of the limit cut-off switch 50, the contacts 50a and 50b are open and the contacts 50c and 50d are bridged. Contact 50c of the cut-off switch is connected to contact 48d of the selector switch, which contact is in turn bridged to the contact 48a thereof when the selector switch is in its "close" position, as shown in Fig. 5. Contact 50d of the cut-off limit switch is connected to the high side of the primary of the transformer 46.

A control relay 51 is connected between one side of the A.-C. source 47 and contact 48c of the selector switch 48 and has its normally-closed contacts 51a bridging the contacts 48a and 48d of the selector switch.

The operation of the fluid motor control circuit is as follows:

When the cut-off gate 28 is to be moved to its open position to allow material to flow through the cut-off valve section into the conveyor conduit 17, the selector switch 48 is moved to its "open" position, causing the contacts 48b and 48c thereof to be bridged. Current then flows from side 47b of the A.-C. source to the contact 48a of the selector switch, then through the normally-closed contacts of the vacuum switch 49 to the contact 48b of the selector switch. Since the contacts 48b and 48c are bridged at this time, current flows through the selector switch to contact 50a of the cut-off limit switch 50. At this time contacts 50a and 50b of the cut-off limit switch are bridged, so current flows to the high side of the primary of the transformer 45 and through the primary back to the side 47a of the A.-C. source.

The solenoid 43 being connected across the secondary of the transformer 45, voltage induced from the primary of that transformer causes current to flow to the solenoid to actuate it, thus causing the valve 41 to move out of the passage 37 to permit fluid to flow from the compressor 36 through the passage 37 to the end 39 of the chamber 35 of the fluid motor 34. The piston 33 of the motor then moves toward the end 40 of the chamber, moving the lever arm 32 upwardly to cause the rod 31 to rotate in a counter-clockwise direction. The counter-clockwise movement of the rod 31 causes the arm 30 to move upwardly, which moves the cut-off gate 28 away from the inlet of the valve section to its open position. When the piston 33 reaches the limit of its travel toward the end 40 of the chamber, it actuates the cut-off limit switch 50, moving the switch arm thereof away from its contacts 50a and 50b, thus interrupting the current path to the primary of the transformer 45. The solenoid 43 is de-energized and the valve 41 returns to its position blocking the passage 37. The piston 33 remains in its position at the end 40 of the chamber, keeping the gate 28 open and allowing material to be fed from the bin along the upper conveying surface of the gas-permeable member 6, through the connector section 18, the gate valve section 19, and through the cut-off valve section 27 into the pneumatic conveyor conduit 17, where it is entrained by the air stream therein and transported to the discharge end of the pneumatic conveyor.

The amount of material discharged into the conveyor conduit may be controlled by the setting of the gate valve 24, so that the pneumatic conveyor is supplied with a volume of material commensurate with its capacity. However, if for some reason, too much material is delivered to the conveyor conduit so that the material piles up and blocks the conduit, the vacuum in the conduit rises to a very high level. Since the vacuum switch 49 is responsive to such a high vacuum, its contacts open, interrupting the current path to the control relay 51 so that the relay de-energizes. The control relay contacts close, thus bridging the contacts 48a and 48d of the selector switch. The limit switch 50 then being in position to bridge the contacts 50c and 50d thereof, current flows from side 47b of the A.-C. source through the control relay contacts 51a and the limit switch 50 to the primary of the transformer 46, then through the transformer primary and to the side 47a of the A.-C. source. Voltage induced into the secondary of the transformer 46 from the primary thereof causes current to flow through the operating coil of the solenoid 44, causing the valve 42 to move out of the passage 38 in the fluid motor. Fluid from the compressor 36 then flows through the passage 38 into the end 40 of the chamber 35, causing the piston 33 to move toward the end 39 of the chamber. When the piston reaches the limit of its travel toward the end 39 of the chamber, it actuates the limit switch 50, returning the switch to its position bridging the contacts 50a and 50b thereof. The movement of the piston 33 is transmitted through the lever arm 32 to the rod 31 which then moves in the clockwise direction, causing the arm 30 to move the cut-off valve gate 28 to its closed position. With the cut-off gate in its closed position, passage of material through the cut-off gate section into the conveyor conduit is interrupted until the air stream in the conduit has had time to break up the block in the conduit and entrain the material. When the block has been blown away, the vacuum in the conveyor conduit drops to its normal level and the contacts of the vacuum switch 49 once more close. The control relay 51 reenergizes at this time and its contacts open, removing the short across the contacts 48a and 48d of the selector switch. The selector switch being still in its "close" position and the limit switch contacts 50a and 50b being bridged at this time, the solenoid 43 once more energizes, allowing air from the compressor 36 to enter the end 39 of the motor 34 to cause the piston 33 to move toward the end 40 of the chamber 35, which causes the gate 28 to move toward its open position in the same manner as above described.

When it is desired to stop flow from the bin into the conveyor line, it is not necessary to close the manually-operated gate valve 24. The selector switch 48 is moved to its "close" position to bridge the contacts 48a and 48d. The motor 34 then operates as described in connection with the operation thereof when the vacuum switch opens to cause the valve gate 28 to move to its closed position, thus halting the flow from the cut-off valve section 27 into the conveyor conduit 17. The gas supply to the plenum chamber in the bin may then be shut off and the material in the bin will no longer be aerated. The particle-to-particle friction of the unaerated material is high enough to prevent the material from flowing along the permeable member 6 into the duct, so that movement of the material is halted.

In many storage installations, space is so restricted that it is not possible or practical to run a conveyor conduit along the front of the bin and adjacent thereto, but rather it is necessary to place the conduit at some distance from the bin where space is available. In the modification of the invention shown in Fig. 6, a duct is provided to connect the outlet side of the valve section to the conveyor conduit. Since the bin, the discharging means therefor, the connector section, and the valve section are identical in this modification with the corresponding parts of the embodiment shown in Figs. 1 through 5, the corresponding parts in Fig. 6 are identified with the same reference characters, primed, and are not further described.

The outlet side of the valve section 19' is connected by means of bolted flanges to an elongated duct 52 having between its sides a gas-permeable member 53 of similar material and permeability to that of the gas-permeable members 6', 20' and 21'. The gas-permeable member 53 and the lower wall of the duct 52 define a plenum chamber 54. Gas is introduced into the plenum chamber 54 from the plenum chamber 21a' of the valve section through a bypass conduit 55 within which a hand-operable valve 56 is positioned to control the flow of gas into the plenum chamber 54.

It may be advantageous, depending on the material being conveyed, to maintain the same pressure differential across each of the gas-permeable members of the apparatus in order to provide uniform aeration of the material as it passes from the bin to the conveyor conduit. Since the duct 52 is subject to a vacuum from the conveyor conduit 17', it is necessary to provide a lower gas pressure in the plenum chamber 54 than in the plenum chambers 13' and 22', if the pressure differential across the gas-permeable member 53 is to be the same as that across gas-permeable members 6', 20' and 21'. By properly setting the valve 56, the pressure differential across the gas-permeable member 53 can be maintained at any differential desired.

The outlet end of the duct 52 is bolted or otherwise securely fastened to the inlet side 26' of the cut-off valve section 27'. The upper end of the plenum chamber 54 is closed by a baffle 57 in the valve section 19' which prevents direct communication between plenum chamber 54 and plenum chamber 21', while the lower end thereof is closed by a wall or flange 58 carried by the cut-off valve section 27'.

The apparatus described above is capable of efficiently and conveniently storing flour, or other pulverulent material, in a storage bin and discharging it therefrom in an aerated form to a pneumatic conveyor. It will be obvious that many modifications may be made in the apparatus specifically described without departing from the scope of this invention. Accordingly, the scope of the invention is not limited to the described embodiment thereof, but only by the scope of the appended claims.

I claim:

1. Apparatus for conveying pulverulent material comprising a bin having a body portion and a discharge port in its lower portion, a first gas-permeable member forming at least a portion of the bottom of said bin and having an upper material-conveying surface, inclined walls extending between said body portion and the adjacent sides of said gas-permeable member to direct material in said body portion onto said material-conveying surface, a plenum chamber extending along and below said gas-permeable member, means for introducing a gas into said plenum chamber to pass through said gas-permeable member and into material on the material-conveying surface thereof to aerate such material, said gas-permeable member being inclined with respect to the horizontal and having its lowermost end positioned opposite said discharge port, a transport line adapted to have an air stream flow therethrough to convey material from said bin to a remote location, a duct extending between said discharge port and said transport line, a second gas-permeable member mounted between opposite side walls of said duct and extending in a generally-inclined direction, a second plenum chamber formed between the lower surface of said second gas-permeable member and the bottom wall of said duct, the passage between the upper surface of said second gas-permeable member and the top wall of said duct being connected to said transport line, and means for introducing gas into said second plenum chamber to pass through said second gas-permeable member and into material on the upper surface thereof to aerate such material.

2. Apparatus as defined in claim 1 including means for maintaining the flow of material through the passage of the duct at a rate substantially equal to the maximum material-carrying capacity of the air stream.

3. Apparatus as defined in claim 1 in which said duct includes side sections adjacent the discharge port of the bin which converge away from the bin and a valve is located beyond said converging sections to control the depth of material which may be passed through said duct along said second gas-permeable member.

4. Apparatus as defined in claim 1 having means including a cut-off valve between said duct and said transport line for selectively establishing and shutting off communication between said duct and said transport line, and means responsive to pressure in said transport line for closing said valve when the pressure in said transport line drops below a predetermined pressure because of an excess of material therein.

5. Apparatus as defined in claim 1 having means including a cut-off valve between said duct and said transport line for selectively establishing and shutting off communication between said duct and said transport line, a fluid motor having a piston connected to said cut-off valve and movable in one direction to move the cut-off valve to establish communication between said duct and said transport line and movable in the opposite direction to move the cut-off valve to shut off communication between said duct and said transport line, a source of fluid under pressure, conduit means connecting said source of fluid under pressure to the fluid motor at opposite sides of said piston, and means for selectively controlling the flow of fluid from said source to the opposite sides of the piston.

6. Apparatus for storing and transporting pulverulent material comprising a bin having substantially vertical sides defining an enclosed body portion of said bin, a closed bottom for said bin including a first elongated gas-permeable member disposed below said body portion of the bin and inclined with respect to the horizontal, said gas-permeable member having an upper material-conveying surface of substantially smaller width than the distance between two opposite sides of said body portion of the bin, a first plenum chamber extending along and below said gas-permeable member, an inclined wall extending from each of said two sides of the body portion of the bin to the adjacent side of the material-conveying surface of the gas-permeable member to direct material from said body portion of the bin onto said material-conveying surface, an inclined wall extending from the uppermost end of said gas-permeable member to a third side wall of the body portion of said bin, said last-mentioned inclined wall and said material-conveying surface within said bin subtending an angle not greater than approximately 90°; a discharge port adjacent the lowermost portion of the bin opposite the lowermost end of said gas-permeable member; means for delivering a gas into said plenum chamber to pass through said gas-permeable member into material on the material-conveying surface thereof to aerate such material, a transport line adapted to have an air stream flow therethrough to convey material from said bin to a remote location, a duct connected between said discharge port and said transport line, a second gas-permeable member mounted between opposite side walls of said duct, a second plenum chamber formed between the lower surface of said gas-permeable member and the bottom wall of said duct, the passage between the upper surface of said second gas-permeable member and the top wall of said duct being connected to said transport line, means for delivering gas into said second plenum chamber to pass through said second gas-permeable member and into material on the upper surface thereof to aerate such material, and manually-operable valve means for maintaining the flow of material through the passage of the duct at a rate substantially equal to the maximum material carrying capacity of the air stream.

7. Apparatus as defined in claim 6 in which said duct includes side sections adjacent the discharge port of the bin which converge away from the bin and said valve means is located beyond said converging side sections.

8. Apparatus as defined in claim 6 in which the means for introducing gas into said second plenum chamber comprises a conduit connected between said first and second plenum chambers including means for controlling the flow of gas through said conduit.

9. Apparatus for storing and discharging pulverulent material comprising a bin having substantially-vertical sides defining an enclosed body portion of said bin, a closed bottom for said bin including an elongated gas-permeable member disposed below said body portion of the bin and inclined with respect to the horizontal, said gas-permeable member having an upper material-conveying surface of substantially smaller width than the distance between two of said sides of the body portion of the bin, a plenum chamber extending along and below said gas-permeable member, an inclined wall extending from each of said two sides of the body portion of the bin to the adjacent side of the material-conveying surface of the gas-permeable member to direct material from said body portion of the bin onto said material-conveying surface, an inclined wall extending from the uppermost end of said gas-permeable member to a third side wall of the body portion of said bin, said last-mentioned inclined wall and said material-conveying surface within the bin subtending an angle not greater than approximately 90°, a discharge port adjacent the lowermost portion of the bin opposite the lowermost end of said gas-permeable member, and means for delivering a gas into said plenum chamber to pass through said gas-permeable member into material on the material-conveying surface thereof at such velocity as to cause material on said material-conveying surface of the gas-permeable member to be aerated by said gas and to flow downwardly to said discharge port by gravity.

10. Apparatus as defined in claim 9 having a duct connected to said discharge port, said duct having a gas-permeable member disposed between opposite side walls, a plenum chamber formed between the bottom wall of said duct and the lower surface of said gas-permeable member, and a manually-operable flow gate valve in said duct for controlling the flow of said material along the upper surface of said last-mentioned gas-permeable member.

11. Apparatus as defined in claim 10 having a baffle between the plenum chamber in the bin and the plenum chamber in the duct and means for maintaining the pressure of gas in the duct plenum chamber at a level such that the pressure differential across the gas-permeable member in the duct is substantially equal to the pressure differential across the gas-permeable member in the bin.

LEO G. WELLER.

References Cited in the file of this patent

UNITED STATES PATENTS

| Number | Name | Date |
|---|---|---|
| 2,527,394 | Browne | Oct. 24, 1950 |
| 2,527,455 | Schemm | Oct. 24, 1950 |
| 2,565,835 | Adams | Aug. 28, 1951 |
| 2,609,125 | Schemm | Sept. 2, 1952 |